(12) United States Patent
Klein et al.

(10) Patent No.: US 6,760,661 B2
(45) Date of Patent: Jul. 6, 2004

(54) METHOD FOR OPERATING A NAVIGATION APPLIANCE, AND ARRANGEMENT FOR CARRYING OUT THE METHOD

(75) Inventors: Bernhard Klein, Pettendorf (DE); Steffen Zehner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/374,008

(22) Filed: Feb. 25, 2003

(65) Prior Publication Data

US 2003/0154024 A1 Aug. 14, 2003

Related U.S. Application Data

(63) Continuation of application No. PCT/DE01/02917, filed on Jul. 31, 2001.

(30) Foreign Application Priority Data

Aug. 25, 2000 (DE) .......................................... 100 41 800

(51) Int. Cl.[7] ............................. G06G 7/00; G08G 1/11; G01C 21/30
(52) U.S. Cl. ........................ 701/210; 701/117; 701/209; 701/211; 701/26; 340/995.12; 340/995.13; 340/995.14; 342/357.09
(58) Field of Search ................................. 701/208, 209, 701/210, 211, 117, 23–26, 118, 207; 340/990, 996, 995.19, 995.21, 995.13, 905, 988, 901, 995.1, 995.12, 995.14; 342/357.01, 357.07, 357.09, 357.13, 357.17, 454

(56) References Cited

U.S. PATENT DOCUMENTS

| | | | | | |
|---|---|---|---|---|---|
| 5,369,588 A | * | 11/1994 | Hayami et al. | ........ | 340/995.19 |
| 5,694,122 A | * | 12/1997 | Nakada | ....................... | 340/990 |
| 5,831,552 A | * | 11/1998 | Sogawa et al. | ........ | 340/995.27 |
| 5,839,086 A | * | 11/1998 | Hirano | ....................... | 701/201 |
| 5,987,382 A | | 11/1999 | Weishaupt et al. | .......... | 701/211 |
| 6,061,629 A | * | 5/2000 | Yano et al. | ................... | 701/209 |
| 6,061,630 A | * | 5/2000 | Walgers et al. | .............. | 701/210 |
| 6,308,133 B1 | * | 10/2001 | Loffert et al. | ............... | 701/211 |
| 6,374,175 B1 | * | 4/2002 | Verron et al. | ............... | 701/200 |
| 2002/0161518 A1 | * | 10/2002 | Petzold et al. | .............. | 701/210 |

FOREIGN PATENT DOCUMENTS

| | | | | |
|---|---|---|---|---|
| DE | 19748077 A1 | | 5/1998 | ............ G08G/1/09 |
| EP | 849563 A2 | * | 6/1998 | ............ G01C/21/20 |
| EP | 0849563 A2 | | 6/1998 | ............ G01C/21/20 |
| EP | 1030280 A2 | | 8/2000 | ......... G08G/1/0968 |
| JP | 04232811 | | 8/1992 | ............ G01C/21/00 |
| JP | 06160109 A | * | 6/1994 | ............ G01C/21/00 |
| JP | 07134795 | | 5/1995 | ......... G08G/1/0969 |
| JP | 10281786 A | * | 10/1998 | ............ G01C/21/00 |
| JP | 11153444 | | 6/1999 | ............ G01C/21/00 |

OTHER PUBLICATIONS mot/Auto Guide, "Blick in die Zukunft", p. 16, Apr. 1999.
PCT International Search Report PCT/DE01/02917, Mailed Dec. 19, 2001.
PCT International Preliminary Examination Report PCT/DE01/02917, Mailed Oct. 27, 2002.

* cited by examiner

*Primary Examiner*—Jacques H. Louis-Jacques
(74) *Attorney, Agent, or Firm*—Baker Botts L.L.P.

(57) ABSTRACT

A method for operating a navigation device comprising a central processing unit (100) and a memory medium (130) with a digitized map is disclosed. The method comprises the following steps: inputting a route with start and target coordinates that can be selected on the map; receiving traffic jam data via an external source (140); displaying a calculated route and the respective traffic jam data; and editing said traffic jam data. In the case of acceptance of a traffic jam a possible bypass of the corresponding route section is calculated and displayed, and in the case of non-acceptance the calculated route section is maintained.

15 Claims, 4 Drawing Sheets

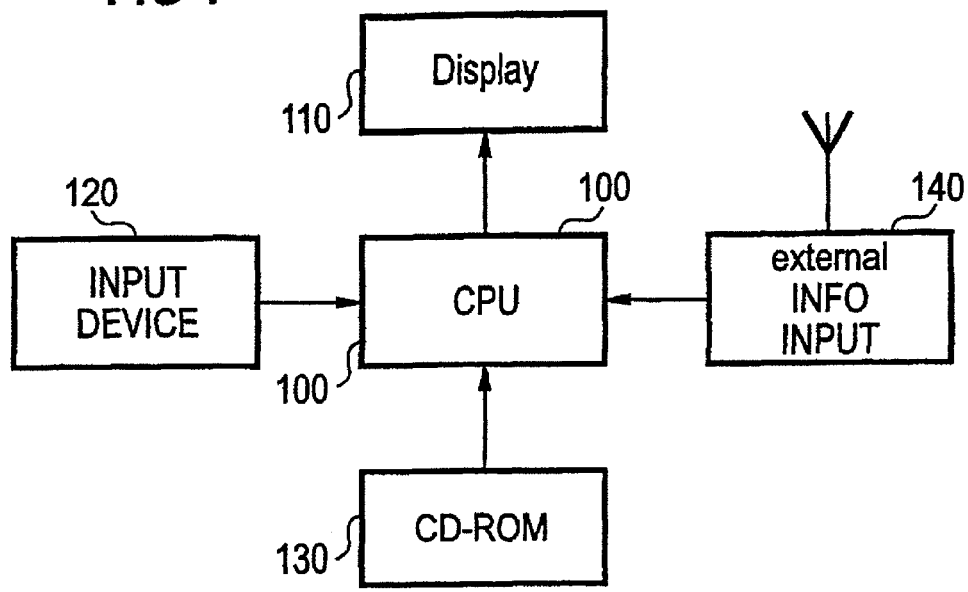
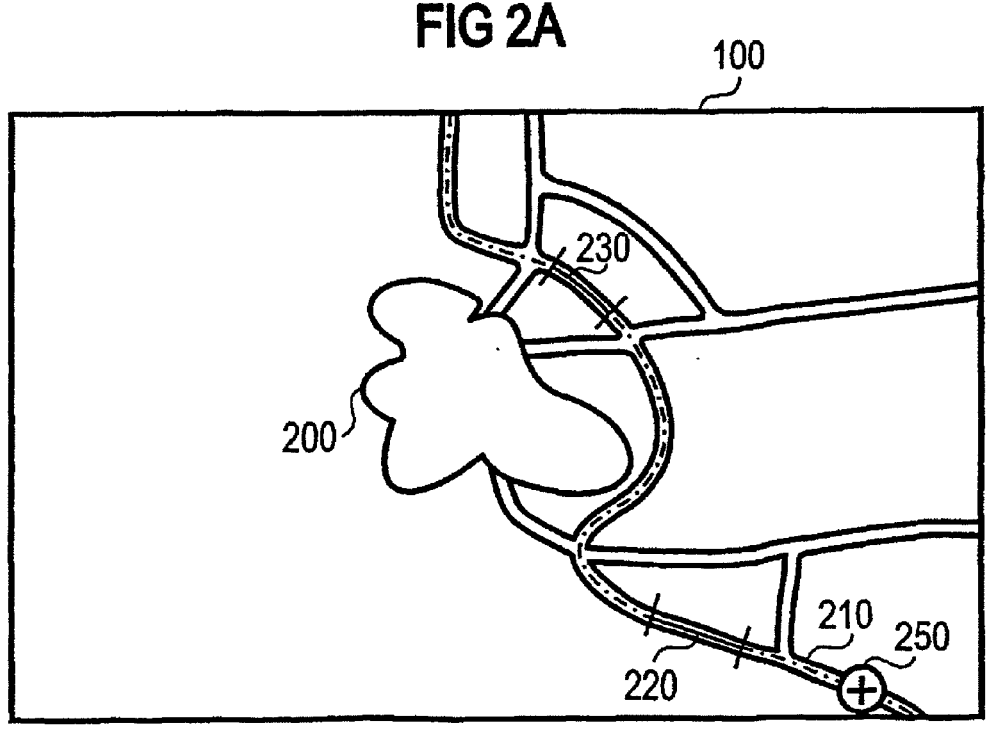

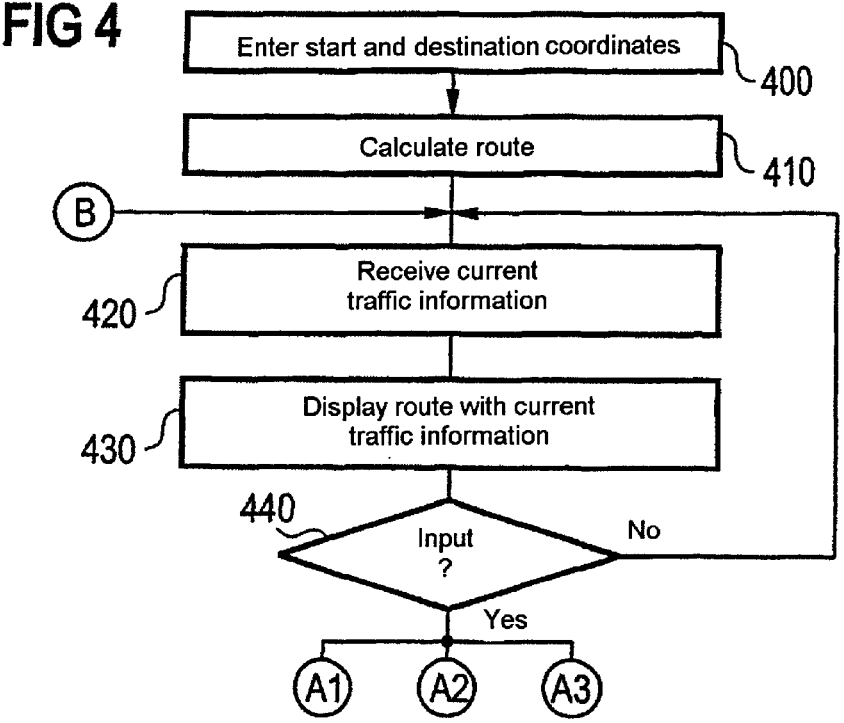
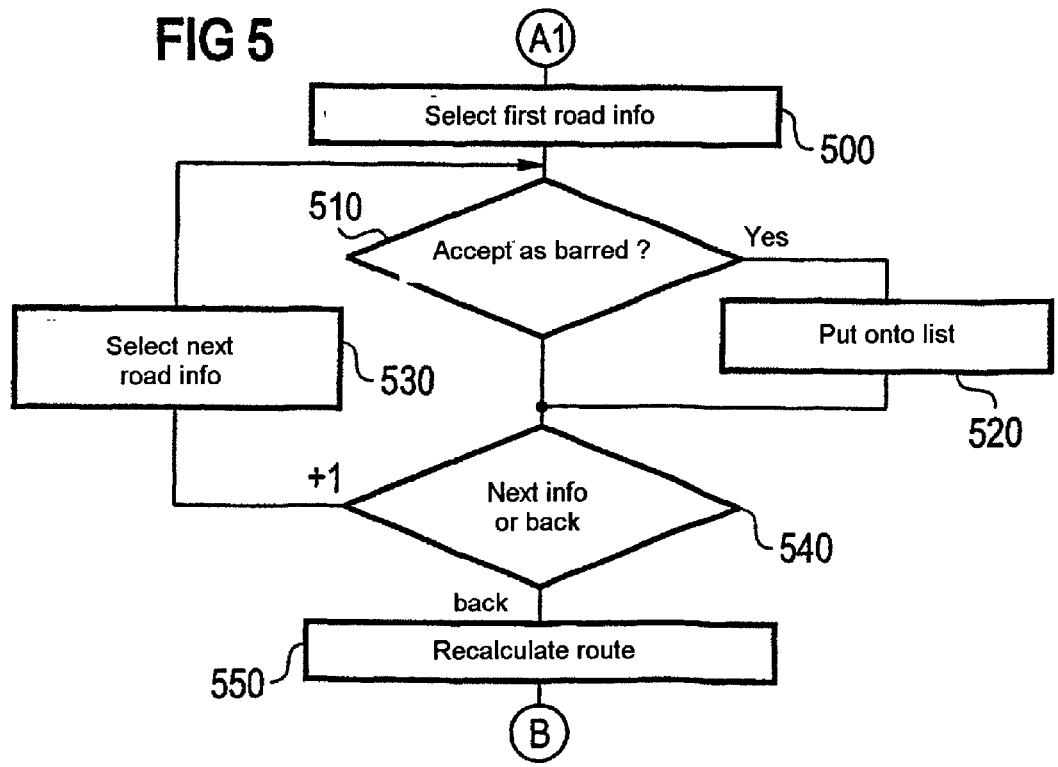

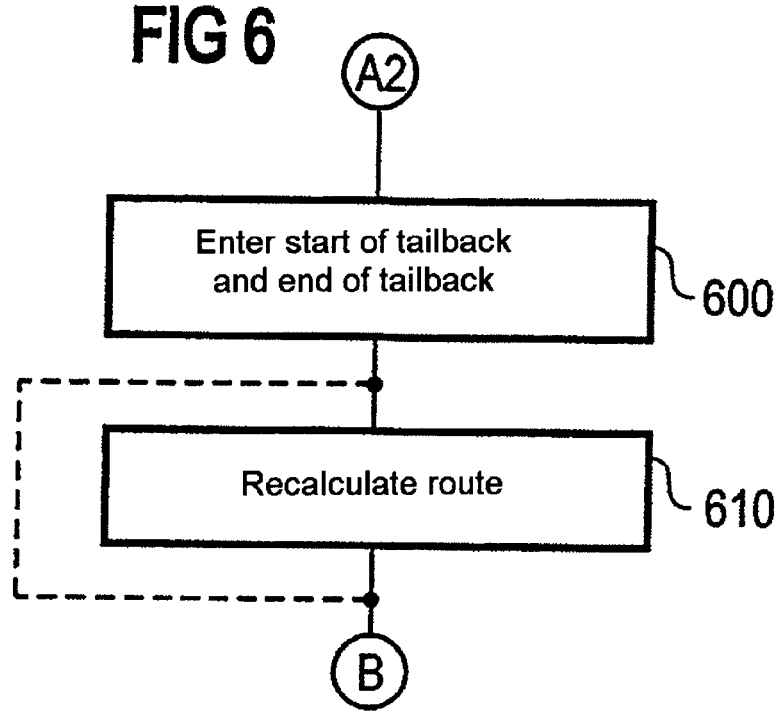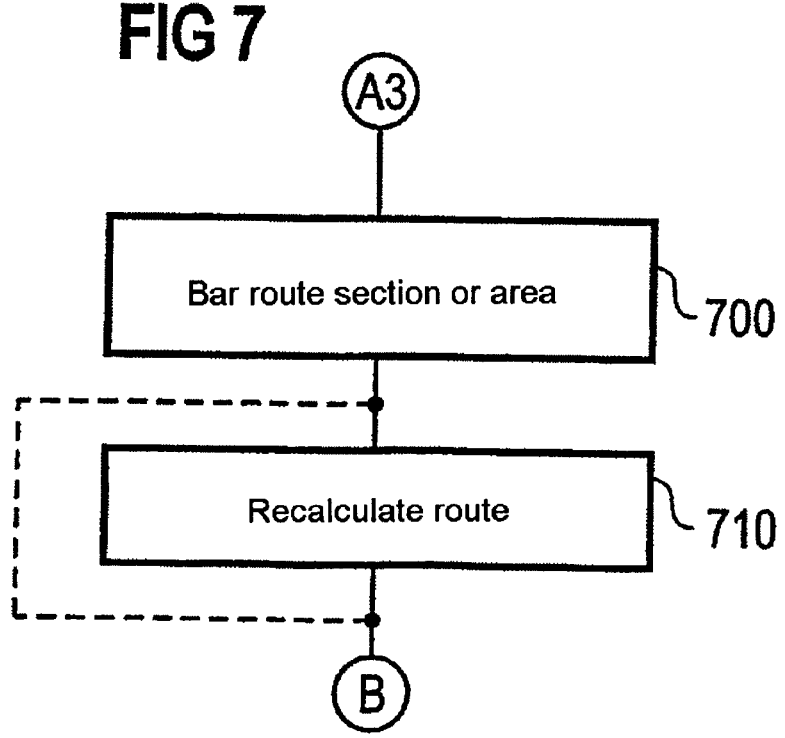

METHOD FOR OPERATING A NAVIGATION APPLIANCE, AND ARRANGEMENT FOR CARRYING OUT THE METHOD

CROSS REFERENCE TO RELATED APPLICATION

This application is a continuation of co-pending International Application No. PCT/DE01/02917 filed Jul. 31, 2001, which designates the United States, and claims priority to German application number DE 10041800.7 filed Aug. 25, 2000.

BACKGROUND OF THE INVENTION

The present invention relates to a method for operating a navigation appliance, and to an arrangement for carrying out the method.

Such a method for operating a navigation appliance is known from laid-open specification DE 43 01 875 A1. This outlines the prior art to be that traffic jams and accidents are displayed on the basis of traffic information received. A recommended road to the destination is output taking into account the traffic information. To allow for the driver's knowledge, on the other hand, the disclosure in the laid-open specification makes provision for the driver to enter points which he wishes to bypass. A recommended route is calculated taking into account the points which are to be avoided.

Navigation appliances, particularly in the field of motor vehicles, are used for routing and for display thereof on a screen, preferably using a digitally displayed map. Modern systems can use "dynamic routing". This involves such a navigation system being combined, by way of example, with an RDF radio, a mobile telephone and/or similar means. Such a combination is used when using current traffic information to determine the best route. Such a system is described on pages 16 ff in the periodical mot/Auto Guide 4/1999, for example. To use it, a driver normally enters destination coordinates in the form of an address using an input unit. The start coordinate used is the current position of the vehicle. The system can then use a service for the purpose of additionally obtaining traffic information. The TMC traffic radio announcement system accessible in Germany transmits traffic information data for this purpose. In addition, there are service providers which provide telematics data, for example using a mobile radio network. The system described includes the information received in the calculation of a route fully automatically. In contrast to previous static navigation systems, these dynamic systems are therefore able to use external sources to include and take into account current road information, such as traffic jams, fog or other circumstances, in the route planning as well.

A drawback of these systems is that previous systems do not allow the user to have any influence on the handling of this additional information.

SUMMARY OF THE INVENTION

It is therefore an object of the present information to specify a method and an arrangement which do not have the drawbacks cited above.

This object can be achieved by a method for operating a navigation appliance having a central processor unit and a storage medium which contains a digitized map, comprising the following steps:

entering a route using destination coordinates which can be selected on the map,
receiving traffic jam data via an external source,
displaying a calculated route and the respective traffic jam data,
displaying a route section with a traffic jam graphically,
output of received traffic jam data on an output unit in editable form,
reception of editing commands for the output traffic jam data from an input device,
calculation of a new route or route section taking into account the edited traffic jam data following reception of a calculation command via the input device.

An area can be defined which is not used for calculating a new route section, wherein the area may be defined graphically by a geometric shape. A route section can be entered manually as a traffic jam area. When the traffic jam data are being edited, the respective data for a traffic jam can be selected sequentially starting with the traffic jam nearest the starting point. A traffic jam starting point and a traffic jam ending point can be entered for the manual entry.

The object can further be achieved by a navigation appliance comprising:

a central processor unit,
a storage medium which contains a digitized map,
means for receiving traffic jam data via an external source,
a display unit for displaying a calculated route and the respective traffic jam data,
means for outputting received traffic jam data on the display unit in editable form,
means for editing the traffic jam data, with the means including an input apparatus, and
means for calculating a new route or route section taking into account the edited traffic jam data.

The input apparatus can be a rotation sensor, a pressure sensor, a joystick, an input-sensitive display, a gesture interpretation apparatus, or a voice recognition unit. The means for receiving traffic jam data may be a mobile telephone or a radio capable of receiving traffic jam messages.

One advantage of the present information is that, besides fully automatically bypassing traffic jams, the driver is also provided with a further option. In this context, he can manually select which traffic jam on the route is relevant and is to be bypassed. In addition, particular subsections of the route can also be barred manually, or particular areas not to be used for the bypass can be selected.

BRIEF DESCRIPTION OF THE DRAWINGS

The invention is explained in more detail below with reference to the figures, in which:

FIG. 1 shows a block diagram of an inventive arrangement for a navigation appliance, FIGS. 2A 2B show displays in a first instance of application, FIG. 4 shows a flowchart for the main part of the inventive method, FIG. 5 shows a flowchart for a first option in the inventive method, FIG. 6 shows a flowchart for a second option in the inventive method, and FIG. 7 shows a flowchart for a third option in the inventive method.

DETAILED DESCRIPTION OF THE PREFERRED EMBODIMENTS

Figure 2B:
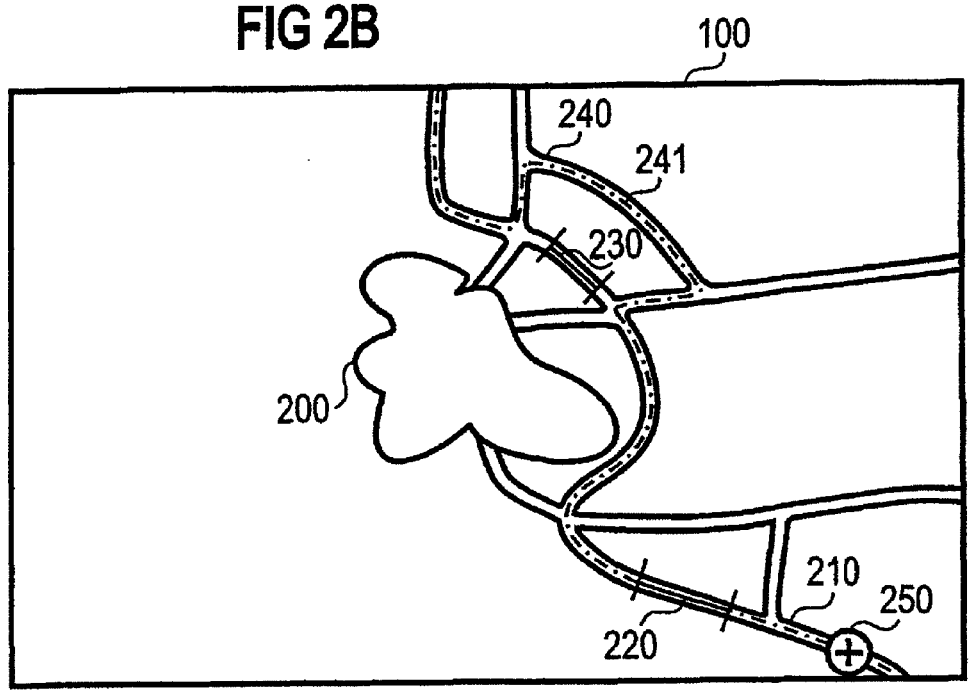

FIG. 1 schematically shows the structure of a navigation appliance in accordance with the present invention. A central processor unit 100 normally features a microcontroller or microprocessor and a memory unit. In addition, requisite peripheral units with corresponding interfaces allowing connection to external units are provided. Thus, a display unit 110 and an input device 120 are provided. The input device 120 can be a joystick, a rotation/pressure sensor, a keyboard or a mouse, for example. In addition, the input device 120 can also be a gesture interpretation device for evaluating hand signals, a voice input device, a sensor device on the display for direct entry using the screen or the like. The reference 130 denotes an external read only memory, for example in the form of a CDROM. Finally, a connection to an external information source 140 is provided. This external information source 140 can be, by way of example, an RDS radio with the ability to receive TMC messages. In addition, this unit can be, by way of example, a mobile telephone for retrieving current road information or another device for receiving external road traffic information.

The way in which the inventive system operates is described below. Normally, starting up the system involves the system providing an opportunity, when the driver has planned a route, to enter a destination coordinate, for example in the form of a destination address (road, house number, zip code . . .). This can be done using a keyboard, voice input, an input-sensitive display or the like. The start address used is normally the current vehicle position. The system then provides a route which is displayed, by way of example, on a screen 110 using a list of the selected roads or using a map display. In the case of graphical display, the chosen route is highlighted visually, e.g. using a suitable choice of color, and the planned route is displayed in this way.

The system can be provided with additional information via external sources 140. By way of example, in Germany, the toll-free TMC traffic radio information system can be linked into the existing system. This system uses a respective radio station to provide digital traffic information which can be processed further by the navigation appliance. This system can transmit, by way of example, traffic jam information or other important traffic information in the form of standardized coordinate information. The system then shows this current road information on the route with visual highlighting on a map.

FIG. 2A schematically shows a map display in accordance with the present invention. A display 100 shows a detail from a map with part of an ascertained route, for example. The references 200 denote a city, for example. The current vehicle position is shown at 250 in the form of a marker. A road included in the planned route is denoted by 210. The dashed line indicates the best route calculated by the system. The references 220 and 230 show two sections of the route to be taken with graphical highlighting. These sections have been identified as being affected by a traffic jam, for example, by the external information unit 140. In the example illustrated, the system indicates these sections of the route as a solid line.

According to the invention, the driver is provided with a number of options when the route has been displayed. By pressing an input key, an option menu can be opened, for example. This can be used to select the following functions, for example:

Change Scale
Next Traffic Jam
Previous Traffic Jam
Select Traffic Jam
Select Start of Traffic Jam
Deselect Traffic Jam
Bypass Zone
Abort
OK Change Scale Option
To move over the route quickly, this option can be used to change the map scale.

Next Traffic Jam Option
To allow the driver to preselect the existing traffic jams quickly, he can select this option in order to jump to the next traffic jam in the direction of travel. This preselects the traffic jam nearest to the vehicle first. This traffic jam can then be highlighted upon selection, for example using a different color. In addition, the marker can be placed on this area in order to indicate that this area has been selected.

Previous Traffic Jam Option
To allow the driver to preselect the existing traffic jams quickly, he can select this option in order to jump to the next traffic jam in the direction opposite to the direction of travel. The marker is then moved as appropriate.

Select Traffic Jam Option
This option allows the preselected traffic jam to be put onto the no-go list. If a traffic jam has been put on the no-go list, this traffic jam can be selected as the selected traffic jam and hence as the traffic jam which is to be taken into account or is not to be taken into account, according to system programming. In the present example, it is assumed that putting a traffic jam onto the no-go list results in this traffic jam being taken into account in the subsequent route calculation.

Select Start of Traffic Jam Option
In this option, the input device 120 can be used to move the marker position to a definable traffic jam starting point along the route. To define the length of the traffic jam, the marker is moved to the respective definable ending point for the traffic jam using the input device 120. This involves the marker being moved from its current position along the ascertained route. It is possible to return to the menu by pressing an enter button in the input device 120. The traffic jam indicator manually generated in this manner can be put onto the no-go list automatically or can be put onto this list using the Select Traffic jam option. Using a suitable choice of color, it is possible to distinguish which traffic jam has been put onto the no-go list and which has not.

Deselect Traffic Jam Option
by using the input device 120 to move the marker to a traffic jam which is already marked, this traffic jam can be selected and the Deselect Traffic jam option can be used to remove it from the no-go list.

Bypass Zone Option
The currently available traffic jam messages are generally limited to the information provided by the respective provider. By way of example, the RDS-TMC information normally covers the highway network in Germany. However, the driver often knows his more specific surroundings and wishes to exclude particular roads from the route calculation. Firstly, it may be that particular roads have disadvantageous sets of traffic lights, are affected by traffic jams as described above, or are affected by other drawbacks. To prevent the route calculation from using a road which is affected by such a known drawback, this option can be used to define a bypass corridor. When the driver has selected this option, a circumscribing rectangle is shown around the selected traffic jam on the map. The rotary knob can be used to increase or reduce the size of this rectangle, that is to say the no-go zone. Pushing the rotary knob returns to the menu, in which, by selecting Select Traffic jam, the area of road defined by the rectangle can be put onto the traffic jam list as a traffic jam area. Alternatively, instead of a rectangle, it is naturally also possible to use any other geometric shape which is appropriate. In addition, it can also be advantageous to define an area freehand. This can be done, by way of example, using an input stylus on a pressure-sensitive screen.

Abort Option

This option is used to exit manual traffic jam selection and to delete all changes to the traffic jam list.

OK Option

This option is used to confirm the traffic jam selection. A fresh route calculation is then performed which calculates a new optimum route on the basis of the selected roads with traffic jams in the no-go list. This new route is then displayed on the display as described previously.

The various inventive functions of the navigation appliance will now be explained in more detail with reference to FIGS. 2A, 2B and 3 and with reference to the flowcharts shown in FIGS. 4 to 7.

The route calculated following entry of the destination coordinates is denoted by 210 and shown in dashes in FIG. 2a. On a color display, the route can be highlighted, for example by means of green coloration if the road network is normally shown in gray. In this case, the route shown contains two sections 220, 230 which have been identified by the external traffic information system. These sections 220, 230 can be shown in blue, for example. The options explained previously are now used by the driver to request this traffic jam list. For the present example, it is assumed that the driver accepts the first traffic jam 220 and does not want to bypass it and that he wants to bypass the second traffic jam 230. By selecting the Next Traffic jam option, the driver will therefore skip the traffic jam 220 and jump to the traffic jam 230. This traffic jam is put onto the no-go list using the Select Traffic jam option. Following selection of the OK option, a new route is ascertained, which is shown by the dash-dot line 241 in FIG. 2B in combination with the previous route, identified by dashes. In this example, the bypass road selected by the navigation appliance is the road 240 in order to bypass the traffic jam 230.

Figure 3:
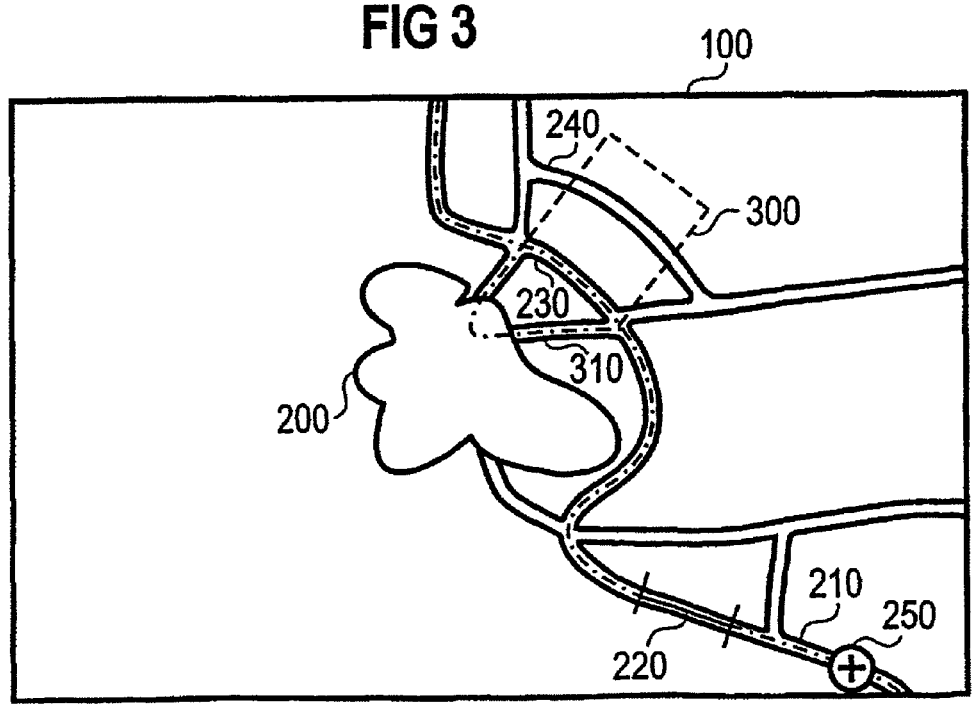
FIG. 3 shows a display in another instance of application.

FIG. 3 shows the function for defining a bypass zone. It is assumed that the driver knows that the secondary road 240, for example a country road, normally likewise has a traffic jam as soon as the highway section is affected by the traffic jam 230. In this case, the driver selects the Bypass Zone option. This generates a rectangle on the screen which can be enlarged, reduced and/or moved by the input device 120. In the present example, this rectangle 300 is defined such that it covers the bypass road 240. By means of confirmation, this section is now put onto the no-go list. To calculate a new bypass road, this section 240 is now no longer taken into consideration. This means that the new bypass route now selected is the new section 310, for example.

FIGS. 4 to 7 show a flowchart of the inventive method for operating a navigation appliance. To start with, the driver enters the destination coordinates in step 400. This is normally done by specifying an address with a road name, house number, zip code and city name, etc. It is naturally also possible to select other entry formats, such as coordinates or codes which are shown on a map. The start address used is the current vehicle position. If a route is to be calculated independently of the current vehicle position, then it is alternatively also possible to enter a start address in the form described above. Next, the appropriate route is calculated by the navigation system in step 410. In step 420, current traffic information is then received. In the next step 430, the route calculated previously in step 410 is shown and is provided with the current traffic information. This can be done, by way of example, by virtue of the reported traffic jam areas being shown highlighted in color, as described previously, and/or being marked using an appropriate text identifier. In step 440, a check is now carried out to determine whether any entry which has selected an option has been made by the user. If this is not the case, the process returns to step 420.

If an entry is made, one of the options described previously is taken. The text below describes three of these options as subprograms A1, A2, A3 in more detail with reference to FIGS. 5, 6 and 7.

FIG. 5 shows the subprogram A1 in more detail. In this subprogram, the supplementary information identified in color, such as traffic jam, fog or other circumstances, is selected. In step 500, the first—and hence that nearest the vehicle—item of road information is selected and is marked using a different color shown on the screen, for example. In step 510, a check is carried out to determine whether this road information needs to be put onto the no-go list. If it does, it is put onto the no-go list in step 520. If it does not, a check is carried out in the next step 540 to determine whether it is necessary to jump to the next item of road information or whether it is necessary to return to the main menu. If it is necessary to jump to the next item of road information, the next item of road information is selected in step 530 and the process jumps to step 510. If it is necessary to return to the main menu, a new route is calculated in step 550 and the process jumps to the connection point B in FIG. 4.

FIGS. 6 and 7 show the respective subprograms for manually entering a traffic jam and for manually entering a no-go area. In FIG. 6, a start of traffic jam and an end of traffic jam are entered by the driver in step 600. Depending on the design of the program, step 610 can be skipped or this manually defined traffic jam can be automatically put onto the no-go list, as a result of which the route is then recalculated in step 610 and the process returns to point B in FIG. 4.

To define a bypass zone, a subsection or an area is barred in step 700. To this end, the driver uses the input device 120 to enter the size of a rectangle. This rectangle is displayed on the screen and can be moved, enlarged or reduced on the screen, for example. In line with the flowchart in FIG. 6, this defined subsection or this defined area can be put onto the no-go list automatically. In this case, a new route is calculated in step 710 and the process returns to point B in FIG. 4.

As described above, the options can be selected using a keyboard or a rotation/pressure sensor. Alternatively, a voice recognition unit or a gesture recognition device can decode and interpret the respective commands. The device described above preferably has a display with a graphical output, e.g. in the form of a map. Alternatively, the display may also be purely text. To this end, the display shows a list of roads which can be taken. Traffic jams can be handled in a separately stored list. A bypass zone can then be entered by entering no-go roads or by entering coordinates, for example.

What is claimed is:

1. A method for operating a navigation appliance having a central processor unit and a storage medium which contains a digitized map, comprising the following steps:

entering route data using start and destination coordinates which can be selected on the map, calculating a route based on the entered route data receiving traffic jam data associated with the calculated route via an external source, displaying the calculated route and respective traffic jam data, displaying a route section of the calculated route with a traffic jam graphically, outputting traffic jam data on an output unit in editable form, receiving editing commands for the output traffic jam data from an input device, and calculating a new route or route section taking into account the edited traffic jam data following reception of a calculation command via the input device.

2. The method as claimed in claim 1, wherein an area can be defined which is not used for calculating a new route section.

3. The method as claimed in claim 2, wherein the area is defined graphically by a geometric shape.

4. The method as claimed in claim 1, wherein a route section can be entered manually as a traffic jam area.

5. The method as claimed in claim 1, wherein, when the traffic jam data are being edited, the respective data for a traffic jam can be selected sequentially starting with the traffic jam nearest the starting point.

6. The method as claimed in claim 4, wherein a traffic jam starting point and a traffic jam ending point can be entered for the manual entry.

7. A navigation appliance comprising:

a central processor unit, a storage medium which contains a digitized map, means for receiving traffic jam data, associated with a route via an external source, a display unit for displaying a calculated route and the respective traffic jam data, means for outputting received traffic jam data on the display unit in editable form, means for editing the traffic jam data, with the means including an input apparatus, and means for calculating a new route or route section taking into account the edited traffic jam data.

8. The navigation appliance as claimed in claim 7, wherein the input apparatus is a rotation sensor.

9. The navigation appliance as claimed in claim 7, wherein the input apparatus is a pressure sensor.

10. The navigation appliance as claimed in claim 7, wherein the input apparatus is a joystick.

11. The navigation appliance as claimed in claim 7, wherein the input apparatus is a input-sensitive display.

12. The navigation appliance as claimed in claim 7, wherein the input apparatus comprises a gesture interpretation apparatus.

13. The navigation appliance as claimed in claim 7, wherein the input apparatus comprises a voice recognition unit.

14. The navigation appliance as claimed in claim 7, wherein the means for receiving traffic jam data is a mobile telephone.

15. The navigation appliance as claimed in claim 7, wherein the means for receiving traffic jam data is radio capable of receiving traffic jam messages.

* * * * *